United States Patent [19]

Zernig et al.

[11] 4,069,549

[45] Jan. 24, 1978

[54] FITTING COMPONENT ANCHORED INTO A SUNK SEAT

[75] Inventors: Ernst Zernig, Hemer; Manfred Ruther, Nachrodt, both of Germany

[73] Assignee: Richard Heinze

[21] Appl. No.: 688,715

[22] Filed: May 21, 1976

[30] Foreign Application Priority Data

May 21, 1975 Germany ............................ 2522393

[51] Int. Cl.[2] .......................... E05D 5/08; F16B 12/20

[52] U.S. Cl. ........................................ 16/158; 85/5 R; 248/27.1; 248/216.1; 248/DIG. 6; 403/7

[58] Field of Search ................. 16/158, 137, 171, 187; 312/111, 263; 403/7, 11, 19, 279, 362, 378, 379; 52/756, 757; 85/1 H, 5 R, 5 P; 24/221 R; 292/251, 256.61; 248/27.1, DIG. 6, 216, 217, 218, 216.1

[56] References Cited

U.S. PATENT DOCUMENTS

| | | | |
|---|---|---|---|
| 1,627,912 | 5/1927 | Lomason | 85/50 B |
| 1,714,233 | 5/1929 | Morris | 52/757 X |
| 1,820,667 | 8/1931 | Leyes | 85/1 H |
| 2,167,910 | 8/1939 | Rottenburg | 85/50 B |
| 2,354,160 | 7/1944 | Wallgren | 403/362 X |
| 3,053,555 | 9/1962 | Lahti | 85/1 H |
| 3,477,745 | 11/1969 | Williams et al. | 403/11 X |
| 3,587,422 | 6/1971 | Kilgus | 403/378 X |
| 3,858,917 | 1/1975 | Nahon | 292/251 X |

FOREIGN PATENT DOCUMENTS

| | | | |
|---|---|---|---|
| 2,325,057 | 6/1973 | Germany | 16/158 |
| 2,831 | 1/1919 | Netherlands | 85/9 R |
| 690 of | 1868 | United Kingdom | 85/50 B |

*Primary Examiner*—Werner H. Schroeder
*Assistant Examiner*—Moshe I. Cohen
*Attorney, Agent, or Firm*—Harris, Kern, Wallen, & Tinsley

[57] ABSTRACT

A fitting component for mounting in a piece of furniture for receiving a hinge or the like. A generally cylindrical fitting component with a central opening for receiving the hinge and a pair of opposed inclined openings, with a locking element positioned in each inclined opening. Each locking element includes a cam section and is rotatable from a first position within the circumferential outline of the fitting component into a second position in which the cam section projects beyond the fitting component circumference for engaging the piece of furniture and anchoring the fitting component therein.

17 Claims, 10 Drawing Figures

Fig.5
Fig.2
Fig.1
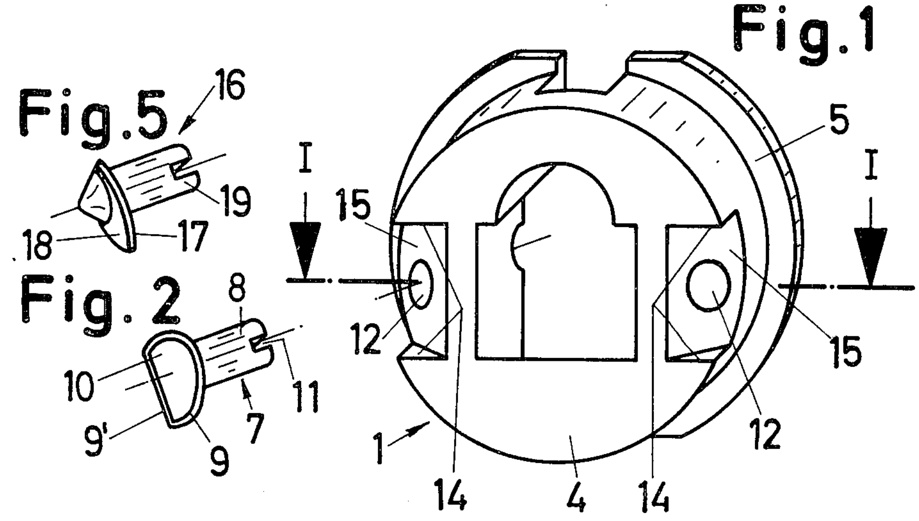
Fig.3
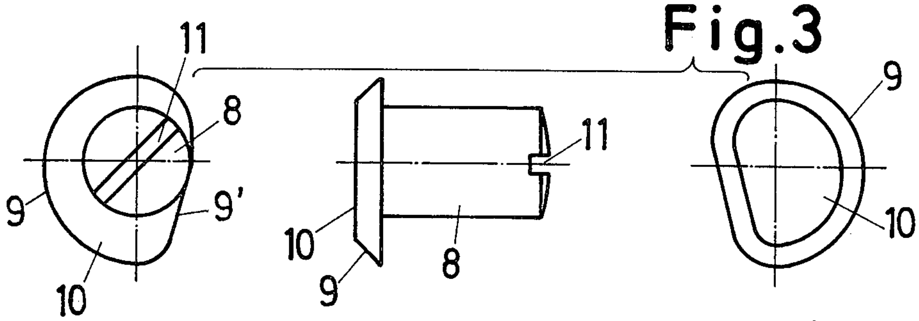
Fig.6
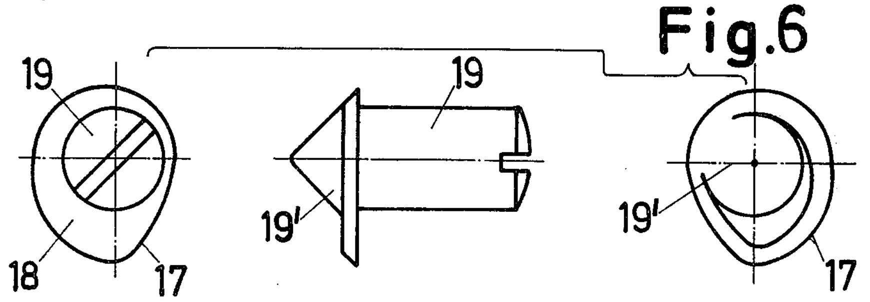

(I-I)

(I-I)

Fig.10
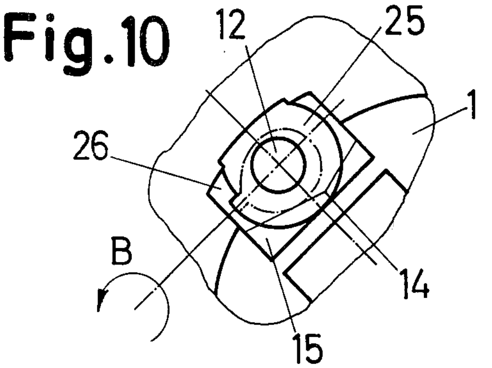
Fig.9
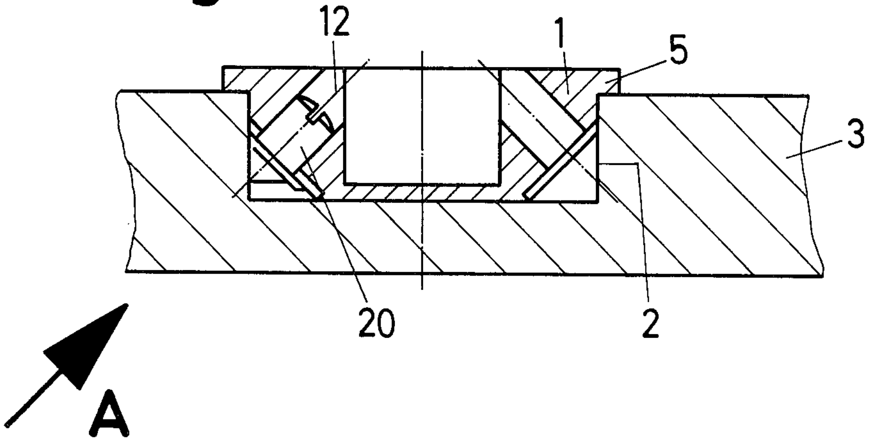
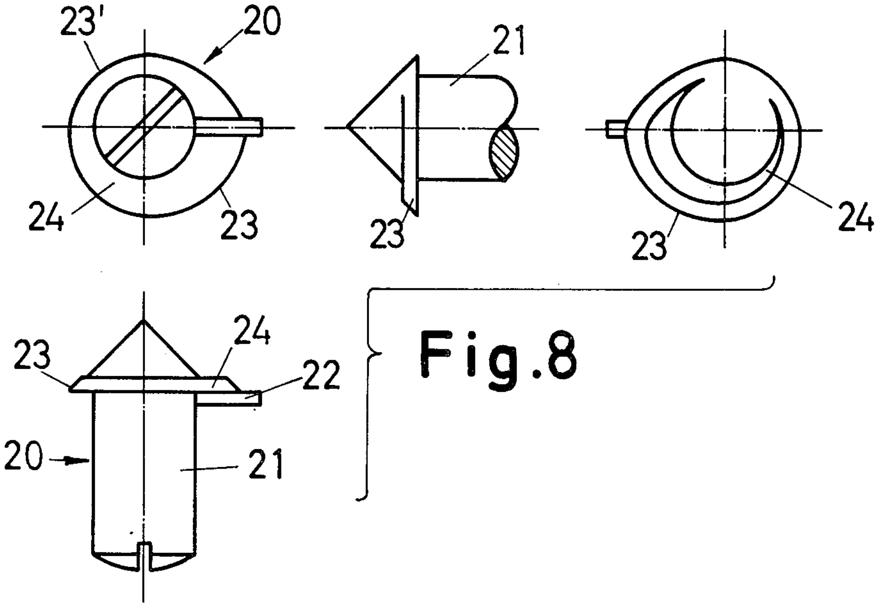
Fig.8

FITTING COMPONENT ANCHORED INTO A SUNK SEAT

The invention refers to a fitting component which can be anchored into an accommodating sunk seat, especially a furniture fitting component, which has at least one locking element and a cam section is provided on this locking element. This locking element can be brought by rotation from a first position within the circumferential outline of the fitting component into a second position in which position the cam section projects beyond this circumferential outline for anchoring the fitting component.

Fitting components of this kind which are, for example, made in cup or cylindrical form and which are used as door side hinge pivot supports or as hinge housings for what are known as cup hinges with four pivot pins and with two pivoted levers can be fastened rapidly, reliably and without any great problems into the corresponding accommodating sunk seats of a furniture component, for example into a furniture door.

A method is known for anchoring fitting components of this kind by screws into a sunk seat of a furniture part. These screws are rotated at a slightly inclined angle into a similarly inclined, half open accommodating bore on the circumference of the cup shaped fitting component. In this case the screws, guided by the sloping angle, penetrate by their threads into the material of the furniture part which encloses this accommodating sunk seat and they cause clamping of the fitting components into the accommodating sunk seat due to the expansion effects. However, in this case, owing to the radial expansion forces, deformation of the fitting components or of the hinge housing can result, whereby the hinge functioning is adversely affected, for example by the tightness of the moving hinge components and due to excessive wear.

A hinge housing or hinge cup is also known, in which a half open bore on the circumference of the hinge housing is provided for fastening purposes. This half open bore runs parallel to the central axis of the hinge housing. Into this bore is placed a cylindrical body with one flat side which, on rotation, generates pressure forces due to the eccentric effect, which results also in clamping of the hinge mounting cup into the accomodating sunk seat on the furniture side. In this case also, a deformation of the housing can occur which leads once again to appreciable trouble in functioning and in this case it leads especially to a tight movement of the moving hinge components as well as to an increased wear. An especial drawback in this known hinge housing or in the selected fastening mode is, moreover, the fact that an appreciable torque must be exerted on the hinge housing on rotating the cylindrical body which is necessary for fastening. This excessive torque changes the position of the hinge housing in the accommodating sunk seat and makes the installation considerably more difficult.

The purpose of the invention is to produce a fitting component which can be fastened into an accomodating sunk seat of a furniture component with little effort and by a simpler means, also by unskilled persons, considerably more readily than previously known fitting components.

For the solution of this problem a fitting component of the type described above is designed according to the invention in such a manner that the locking element can be rotated about an axis which is inclined to the central axis of the fitting component.

The advantages gained by this invention are specially that the fastening or the anchoring of the fitting components can be carried out directly also by unskilled persons and that the quality of the anchoring is considerably less adversely affected by the tolerances between the accommodating sunken seat in the furniture and the fitting component than in the case of the known fitting components or in the case for the fastening method selected for known fitting components. By means of a corresponding design of the cam section on the locking element it is possible by this invention to achieve a secure and reliable anchoring of the fitting components even if the accommodating sunken seat has been made larger than the diameter of the fitting component.

By the inclination of the rotating axis of the locking element the fitting component is pulled firmly into the accommodating sunken seat on locking, whereby the forces generated in this case are directed in such a manner that a detrimental deformation or twisting of the fitting component is effectively avoided.

It is also possible to carry out a number of installation and dismantling operations without reducing the reliability of the fastening of the fitting component. The fitting component according to the invention is hence especially suitable for furniture which can be taken apart and which is to be erected by the user, and it is designed for dispatch in compact packages and requires uncomplicated assembly methods.

In a further version of the invention it is proposed that the locking element and/or the fitting component are provided with a stop or with a limiting device for the rotating angle of the locking element. It is also useful to provide the cam section with a cutting knife or saw tooth shaped cutting edge. Additional versions of the invention are described in the subsidiary claims.

The invention is explained below in greater detail in conjunction with the drawing figures, with some alternative embodiments. In the drawings:

FIG. 1 shows a cup shaped furniture fitting component in perspective view from below, in the form of a cylindrical shaped hinge housing for what is known as a "cup hinge"; hinge arms and pivoted levers are not shown;

FIG. 2 is a perspective view of a locking element for use with the fitting component of FIG. 1;

FIG. 3 is rear view, side view and front view of the locking element of FIG. 2;

FIGS. 5 and 6 show another version of the locking element in perspective view and in rear view, side view and front view, respectively;

FIG. 8 is rear view, front view and side view from right and left of another version of the locking element;

FIG. 9 is a section through the fitting component of FIG. 1 inserted into an accommodating sunk seat of a furniture part in the as yet unlocked condition together with a locking element of FIG. 8; and FIG. 10 is a perspective part section view of the cup shaped fitting component of FIG. 9 in the direction of the arrow A of FIG. 9.

Figure 4:
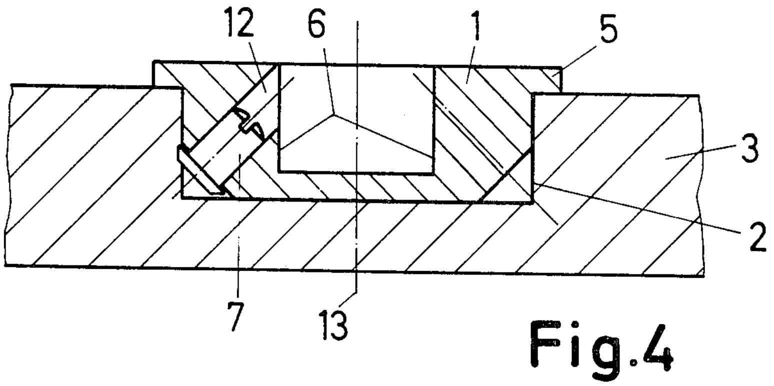
FIG. 4 is a section along the line I—I of FIG. 1 showing the fitting component anchored in an accommodating sunken seat in a furniture component by using the locking element of FIGS. 2 and 3.

The cup shaped fitting component 1 shown in the figure consists basically of a cylindrical shaped body 4 which can be inserted into a sunk seat 2 of a furniture part 3 (ig. FIG. 4), for example into a furniture door, the cylindrical body has a laterally projecting flange 5 at its upper side which is visible after its insertion into the accommodating sunk seat. This flange 5 rests by its underside on that region of the top surface of the furniture part which surrounds the accommodating sunken seat 2 and it is used on the one hand for limiting, in a given manner, a prescribed insertion depth for the fitting component 1 in the accommodating sunk seat. On the other hand the flange 5, as described below later in detail, contributes considerably to the anchoring of the fitting component 1 in the accommodating sunk seat 2.

In the version examples shown in the figures the fitting component 1 forms the hinge housing for what are known as the cup shaped hinges. In hinges of this kind the pivoting system consists also, in a known manner, for example, of two pivoted levers, which are pivoted at one end by means of pivoting pins on a furniture part, for example on the furniture body, and at the other end they are pivoted by pivoting pins on the other furniture component, for example on a furniture door, in which the fitting component 1 shown in the figures is used for supporting or for holding of the pivot pins specified for this other furniture component. The fitting component 1 is provided with an opening 6 for supporting the pivoted levers and the pivoting levers will project partly into this opening.

The pivoting pins as well as the other part of the hinge are not shown in the figures for clarity reasons.

For anchoring and for holding of the fitting component 1 in the accommodating sunk seat 2 of the furniture part 3, for example, locking elements 7 are used which are shown in FIGS. 2 and 3 and which consist of a cylindrical pin 8 with the cam section 9. The cam section 9 is designed in this case as a disc shaped part formed at one end of the pin 8 or as an eccentric 10 with circular segment shaped cross section. At the other end of the pin 8 the locking element has a slot 11 for accommodating a screwdriver.

In the fitting component 1 there is provided for each locking element a hole 12 in which the pin 8 of the locking element 7 is held so that it can rotate and which, as shown for example in FIG. 4, is inclined in such a manner to the central axis 13 of the fitting component 1 that the distance of the bore 12 from this central axis 13 increases towards the underside of the fitting component 1. In the version example shown in FIGS. 1 to 4 the hole 12 joins the central opening 6 of the fitting component 1 and hence this hole is less disturbing to the eye on viewing after the fitting component 1 has been installed.

On the underside of the fitting component 1 an opening 14 is provided at each hole 12 and this opening 14 accommodates the disc shaped part 10 of the given locking element 7 and against its surface 15, which is at right angles to the axis of the bore 12, rests the disc shaped part 10 by its side which faces the pin 8. In the version example shown, two holes 12 at 180° spacing for two locking elements 7 are arranged on the circumference of the fitting component 1.

On fastening the fitting component 1 into the accommodating sunk seat 2 of the furniture part 3 the fastening elements 7 are inserted first by their pins 8 in such a manner that the part 9' of the cam section 9 which has the minimum distance from the axis of the pin 8 is orientated towards the outside face or towards the outside circumference of the fitting component 1. The distance between the component 9' and the axis of the pin 8 is selected in this case so that the part 9' does not project beyond the outside circumference of the fitting component 1 so that the fitting component 1 can be inserted without obstruction into the accommodating sunk seat 2. After the insertion of the fitting component 1 into the accommodating sunk seat each of the locking elements 7 is rotated by means of a screwdriver, which engages with the slot 11, in the hole 12, in which case the cam section 9 projects, starting from a given rotating position, progressively further beyond the circumference of the fitting component 1 and it penetrates into the material of the furniture component 3 which surrounds the accommodating sunk seat 2. Since the pin 8 of each locking element 7, corresponding to the position of the hole 12, is orientated at an angle to the central axis 13 of the fitting component 1, therefore not only does anchoring of the fitting component occur due to an expansion effect, but at the same time the fitting component 1 is also pulled into the accommodating sunk seat 2 until the underside of the flange 5 rests tightly against the surface of the furniture component 3. In order to achieve the best possible anchoring effect the cam section 9 is provided with a ratchet action cutting edge, which promotes the penetration of the cam section 9 into the surrounding material of the furniture component 3 and which at the same time effectively acts against any undesirable tearing out of the fitting component 1 from the accommodating sunk seat 2. The inclined position of the pin 8 in the fitting component 1 also has the advantage that the pin 8 cannot slide out from the hole 12 when the fastening component is firmly fixed, without requiring any additional special securing of the locking element 7 or its pin 8 in the fitting component 1. The cam section 9 can have a saw tooth type edge or it can be provided with a number of teeth which act against any undesirable rotation of the locking elements which are provided instead of the cutting edge or as an addition to the cutting edge.

The approximately circular segment shaped designed disc shape part 10 is formed eccentrically on the locking element shown in FIGS. 2 and 3 on the pin 8 in such a manner that the distance of the cam section 9 from the axis of the pin 8 increases continuously in the pin circumferential direction along a spiral curve, in which the part 9' coincides approximately with the pin external circumference.

The locking element 16 shown in FIGS. 5 and 6 corresponds basically to the locking element 7; in this version the disc shaped component 18 which forms the cam section 17 is formed approximately as an ellipse and it is once again fastened on the associated pin 19 eccentrically in such a manner that the cam section 17 distance in the pin circumferential direction increases from the axis of the pin 19 by means of which, in this case once again, even in the case of wider tolerances in the making of the accommodating sunk seat 2 in the furniture part 3, the more or less marked rotation of the locking element 16, or the rotation of the pins 19 which engage with the hole 12 of these elements, ensures secure anchoring of the fitting component.

The locking element 16 shown in FIGS. 5 and 6 has a conical end 19' in which the disc shaped part 18 is arranged between this conical end and the end of the pin 19. A considerably more favorable force distribution in the locking element is ensured by the conical end 19'.

Figure 7:
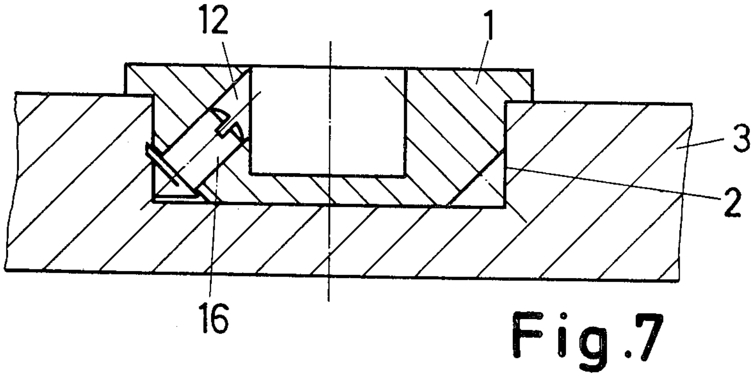
FIG. 7 is a section along the line I—I of FIG. 1 showing the fitting component anchored into an accommodating sunk seat in a furniture component by using a locking element of FIGS. 5 and 6.

The anchoring of the fitting component 1 is carried out with the locking element shown in FIGS. 5 and 6 in the same manner as described in conjunction with FIGS. 1–4. FIG. 7 shows a fitting component anchored with the locking elements according to FIGS. 5 and 6.

In order to facilitate the installation as well as the dismantling of the fitting component 1 it can be useful to restrict the rotating range of each locking element and to establish in this case, especially for the locking element, an initial position in which the cam section does not project beyond the circumference of the fitting component 1.

The locking element 20 shown in FIG. 8 is provided for this purpose; this element otherwise corresponds to the locking element 16 of FIGS. 5 and 6, with a lug 22 which projects radially from the pin 21 and beyond the circumference of the pin. This lug 22 is formed on the disc shaped part 24, which forms the cam section 23, on the side facing the pin 2. A seat 25 which is concentric to the bore 12 is provided for the lug 22 on the surface 15 of the opening 14. A projection 26 (FIG. 10) projects into this seat 25 as the fitting component side opposite stop. The lug as well as the projection 26 are arranged in such a manner in this case that when this lug rests against the projection 26 then the cam section part 23' is orientated with minimum distance from the axis of the pin 21 to the outside circumference of the fitting component 1. The fitting component is inserted into the accommodating sunk seat 2 of the furniture component 3 (FIG. 9) when the locking element 20 is in this position. Subsequently the locking elements or the pins 21 of these locking elements held in the holes 12, are rotated in the direction of the arrow B of FIG. 9 by means of a screwdriver, which results in the above described anchoring of the fitting component.

We claim:

1. A fitting component which can be anchored into an accommodating sunk seat of a piece of furniture or the like and having a central axis and at least one locking element with a cam section provided on the locking element, with the locking element rotatable about a rotating axis from a first position in which the cam section is within the circumferential outline of the fitting component for insertion of the component into the sunk seat, into a second position in which the cam section projects beyond the fitting component circumference for anchoring purposes of the fitting component, characterized in that said rotating axis is inclined to said central axis of the fitting component and that said cam section of said locking element cuts into the piece of furniture when rotated to said second position, with said component inserted and anchored without tilting said component.

2. A fitting component as defined in claim 1, characterized by the fact that said rotating axis of said locking element is inclined in the direction of the nonvisible underside of the fitting component away from said central axis of the fitting component.

3. A fitting component as defined in claim 1, including two of said locking elements arranged on the circumference of the fitting component opposite each other.

4. A fitting component as defined in claim 1, characterized by the fact that said locking element is formed by a pin which is held in a bore of the fitting component and provided with the cam section.

5. A fitting component as defined in claim 4, characterized by the fact that said cam section is formed integrally with said pin.

6. A fitting component as defined in claim 1, characterized by the fact that said cam section comprises an eccentric disc.

7. A fitting component as defined in claim 6, characterized by the fact that said eccentric disc has approximately an elliptical cross section.

8. A fitting component as defined in claim 1, characterized by the fact that said cam section runs as a spiral relative to said rotating axis of said locking element.

9. A fitting component as defined in claim 1, characterized by the fact that said cam section has a knife edge type cutting edge.

10. A fitting component as defined in claim 1, characterized by the fact that said cam section has a saw tooth form, hook shaped cutting edge.

11. A fitting component as defined in claim 4, characterized by the fact that said locking element has a conical end and that said cam section is disposed between said conical end and said pin.

12. A fitting component as defined in claim 1, characterized by the fact that said locking element includes means for engaging a tool.

13. A fitting component as defined in claim 1 wherein said component includes an opening open towards the fitting component underside for accommodating the locking element cam section.

14. A fitting component as defined in claim 1 including at least one stop for limiting the rotating angle of said locking element.

15. A fitting component as defined in claim 14 characterized by the fact that said stop is formed by a lug situated in an opening of the fitting component, which lug is in a radial direction to a pin of said locking element and projects beyond the circumference of said pin, and characterized by the fact that a section of the fitting component projects into said opening on the fitting component and acts as a counter stop.

16. A fitting component as defined in claim 15, characterized by the fact that said lug is formed on the cam section of said locking element.

17. A fitting component as defined in claim 1, characterized by the fact that it forms a cylinder shaped hinge housing for a cup hinge.

* * * * *